Figure 1:
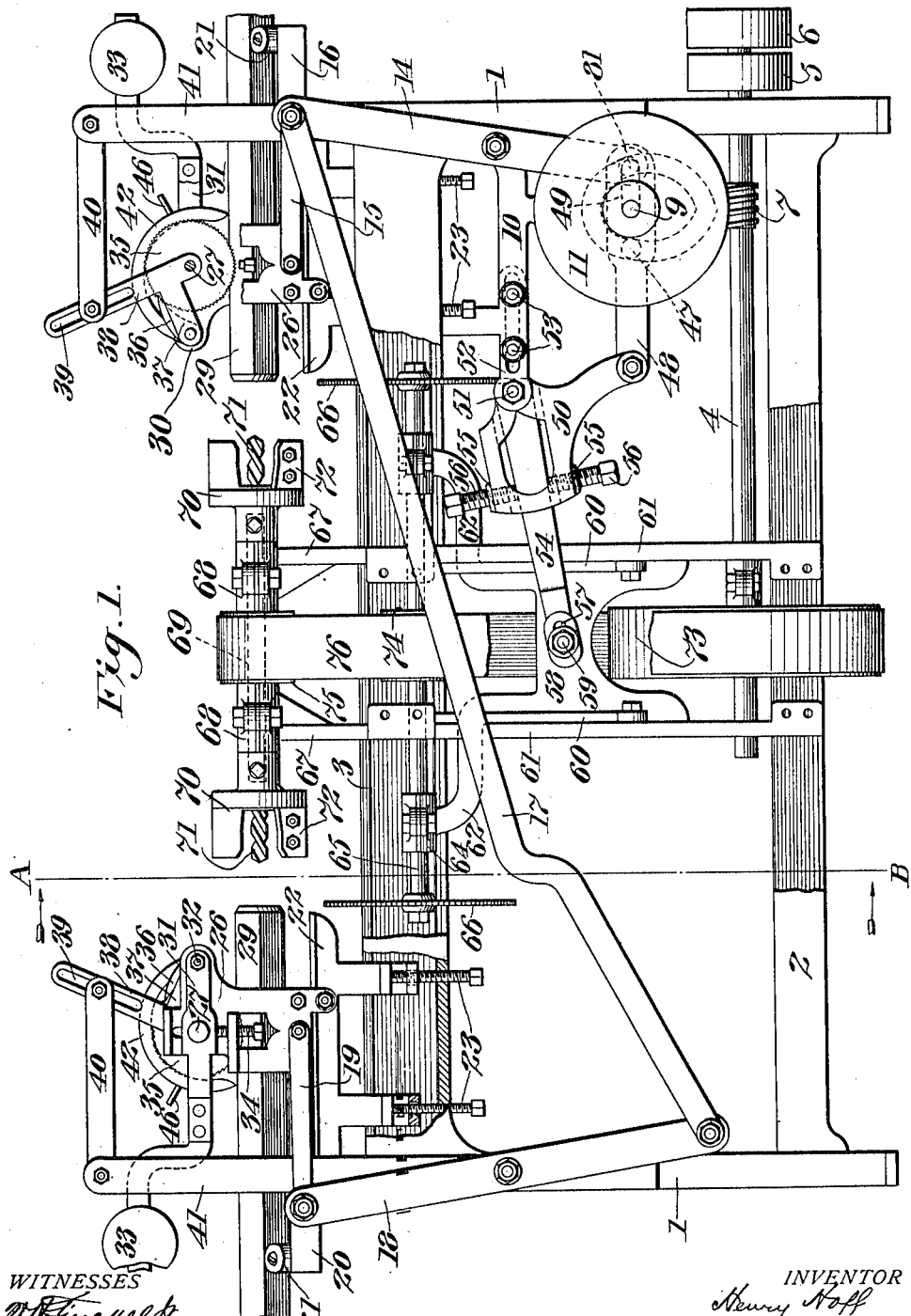

H. HOFF.
PLUG MAKING MACHINE.
APPLICATION FILED APR. 22, 1913.

1,096,718.

Patented May 12, 1914.
3 SHEETS—SHEET 1.

WITNESSES

INVENTOR
Henry Hoff
by Wm H Finckel
Attorney

H. HOFF.
PLUG MAKING MACHINE.
APPLICATION FILED APR. 22, 1913.
1,096,718.
Patented May 12, 1914.
3 SHEETS—SHEET 2.
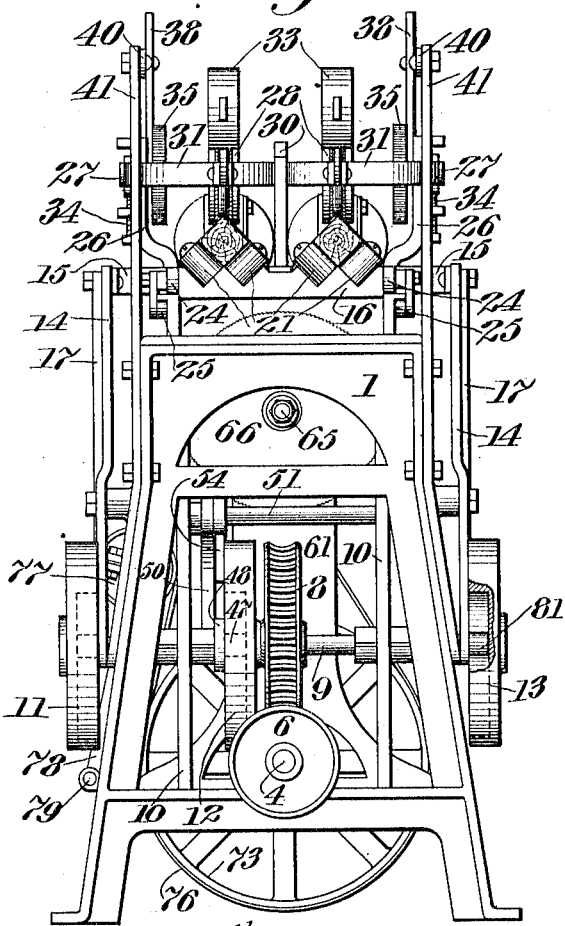
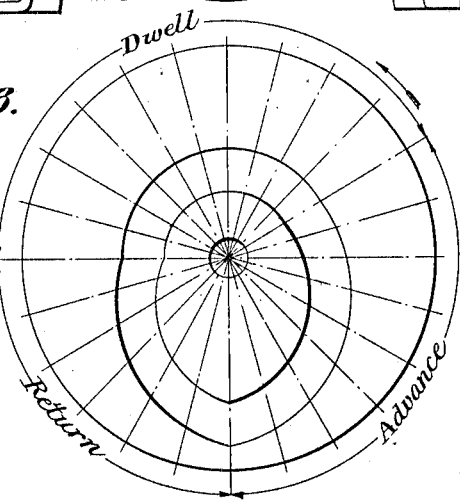
WITNESSES
INVENTOR

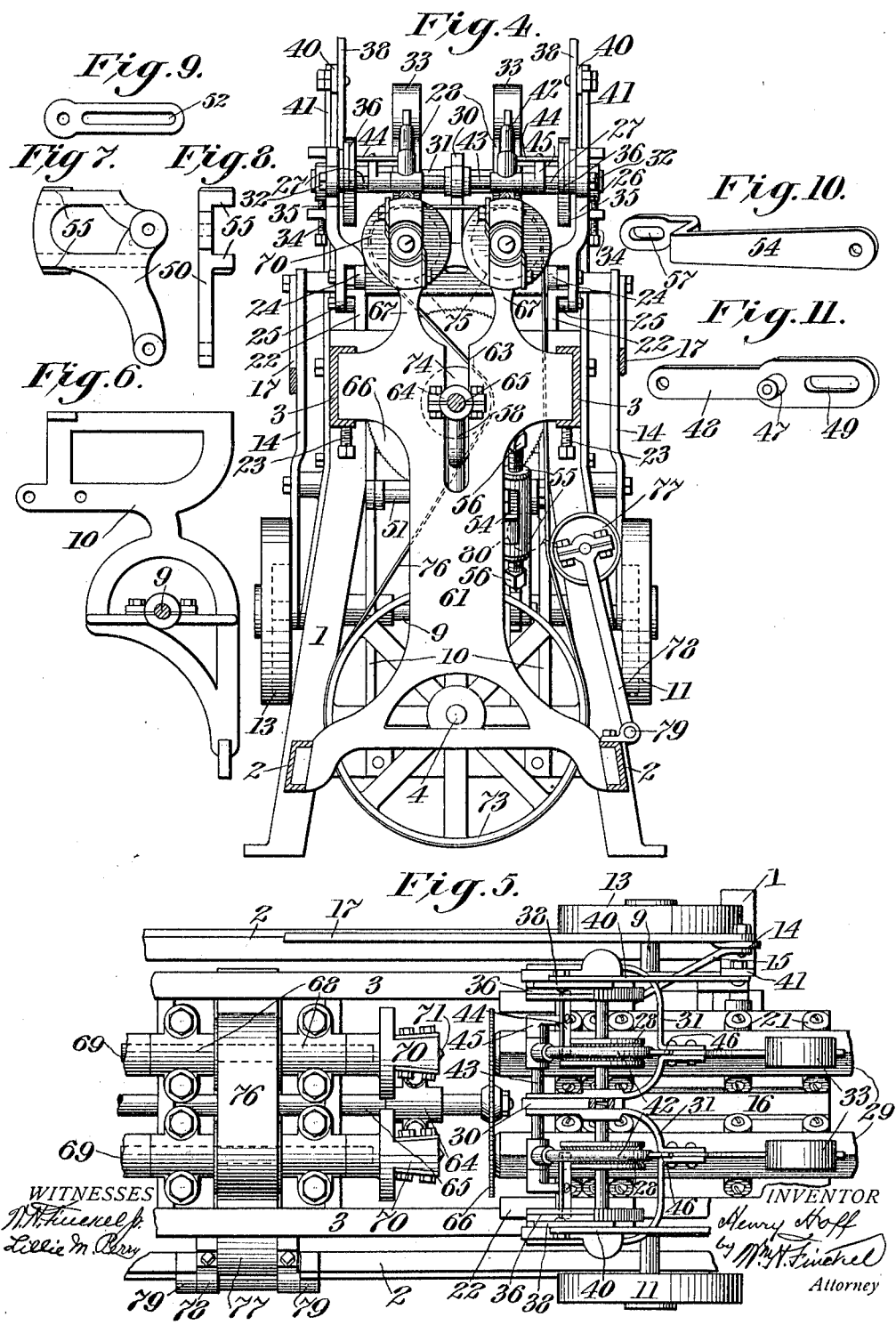

UNITED STATES PATENT OFFICE.

HENRY HOFF, OF YORK, PENNSYLVANIA.

PLUG-MAKING MACHINE.

1,096,718.   Specification of Letters Patent.   Patented May 12, 1914.

Application filed April 22, 1913. Serial No. 762,948.

*To all whom it may concern:*

Be it known that I, HENRY HOFF, a citizen of the United States, residing at York, in the county of York and State of Pennsylvania, have invented a certain new and useful Improvement in Plug-Making Machines, of which the following is a full, clear, and exact description.

The object of this invention is to provide a machine for making economically and quickly the wooden plugs, commonly used in the ends of rolls of paper, wire, wire netting and other merchandise put up for the market in roll form. As is well known, these rolls are formed on a mandrel or core, so that when the mandrel or core is withdrawn a hole or cavity extends through the roll. The weight of the roll and the rough handling it receives would tend to break down its ends if unsupported, and it is customary to support these ends by wooden plugs inserted in the ends of the hole or cavity in order to avoid such breaking down or deformation of the roll.

This invention relates to machines for forming these plugs, but obviously its principle may be embodied in machines for making bungs and other articles.

The invention consists of a combined turning and sawing machine in which the stock is fed to a cutter head and turned, and a saw next comes into action to sever the turned article from the stock, the cutter head turning in fixed bearings and the saw mounted in a carriage or frame movable toward and from the stock at intervals. In the illustrated construction, there are four cutter heads arranged in pairs at opposite ends of two spindles or shafts, and work supports or stock-feeding devices are placed opposite these cutter heads, and two saws are mounted in a movable carriage or frame, common to both, the saws being placed in the same relation to the opposite cutter heads. A single carriage may support any number of stock-feeding means.

Having thus stated the principle of my invention, I will proceed now to explain the same more particularly, and then will point out and distinctly claim the part, improvement or combination which constitutes the invention.

In the accompanying drawings, illustrating the invention, in the several figures of which like parts are similarly designated, Figure 1 is a side elevation of a machine embodying the principle of the invention, parts being broken out to expose more fully the parts back of same. Fig. 2 is a right-hand end elevation of Fig. 1, part of one of the stock-feed carriage-operating cams being broken out. Fig. 3 is an elevation, on a larger scale, showing one of the three identical cams used to give motion to the stock feed-carriages and the saw carriage. Fig. 4 is a vertical cross-section taken substantially on the line A B, Fig. 1. Fig. 5 is a top plan view of the right-hand portion of Fig. 1, the lower right-hand corner being broken away. Fig. 6 is an elevation of the bracket on which is supported the saw-carriage actuating lever, among other things. Fig. 7 is an elevation and Fig. 8 is an edge view of said actuating lever. Fig. 9 is an elevation of an adjustable link for connecting the said lever and bracket. Fig. 10 is a perspective view of the lever arm of the saw-carriage actuating lever. Fig. 11 is a perspective view of the bar for connecting the saw-carriage actuating lever and its cam.

The frame may be of suitable construction to support the various parts, and is here shown as composed of like end pieces 1, connected by longitudinal stringers 2 and 3. A main shaft 4 is supported lengthwise in the frame, and has usual fast and loose pulleys 5 and 6 at one end to receive a power belt. On this shaft is a worm 7, which meshes with a worm wheel 8 on a countershaft 9 arranged transversely in the brackets 10 fixed to one of the end pieces 1. On this countershaft are fixed three similar cams 11, 12 and 13, the cams 11 and 13 having their cam-grooves facing one another, and operating the stock feed-carriages, and the cam 12 having its cam-groove arranged to operate the saw carriage, in such way that the stock feed-carriages are at rest while the saw carriage is operative, and vice versa. The cams 11 and 13 vibrate upright levers 14 mounted upon the end frame upon opposite sides and on the outside, and these levers are connected by links 15 with the stock feed-carriage 16, so as to reciprocate it lengthwise of the frame. These levers are also connected by links 17 with levers 18 at the opposite end of the machine, and these levers 18 are connected by links 19 with a similar reciprocating stock feed-carriage 20 at that end of the machine, in such way that the carriages at opposite ends of the machine are moved toward one another at the same time and then reversed, and this is accomplished by extending the links 17 from the upper ends of the levers 14 to the lower ends of the levers 18 in the scheme of construction herein illustrated. The cam-grooves are so constructed that the carriages will be fed in a given direction continuously, so as to advance the stock into the cutters progressively with the cutting operation, and the motion of the carriages is reversed, and then halted until the saws are brought into operation to cut off the work, and recede, and then the forward movement of the carriages is repeated. The described movements of the saws is effected by the intermediate cam 12, through connections presently specified. I note here that the machine shown is constructed to produce four identical articles at one operation, and to this end has like stock feed-carriages at opposite ends, each of them capable of feeding two pieces of stock simultaneously; two pairs of cutters, also simultaneously operated, and a pair of saws mounted in a single saw carriage; but the principle of the invention is applicable for operation upon a less or greater number of pieces of stock.

The stock feed-carriages at opposite ends of the machine being alike, a description of one will apply to both. The carriage is provided with the stock-receiving rollers 21 having their axes at right angles so as to support square pieces of stock, although the invention is not limited to this arrangement. 22 is a runway for the carriage, mounted upon the frame and vertically adjustable by means of the set-screws 23, so as to aline the stock with the cutter-heads, and to adapt the machine for use with stock of different thicknesses. The carriage has wheels 24 by which it is movably supported upon the runway, and it also has underhung wheels 25 engaging flanges on the runway, so as to prevent the carriage from jumping the runway and from rising off of the runway when the saw rises to cut off the finished article. The sides of the carriage are extended upwardly at 26 and provided with housings for transverse shafts 27 on which are fixed the friction feed rolls 28 adapted to bear upon and forwardly feed the pieces of stock 29. The inner ends of the shafts 27 enter slots in an intermediate standard 30 to keep them in alinement, and they are carried by the yokes 31 pivoted at 32 to the carriage sides 26 in advance of the feed rolls; and these yokes are provided with the adjustable weights 33 whereby sufficient tension or pressure is put upon the feed rolls to cause them to advance the stock. Set-screws 34 may be mounted in the carriage frame to limit the downward movement of the yokes. The shafts 27 carry ratchet wheels 35 which are engaged by pawls 36 pivoted to arms 37 on levers 38, which are fulcrumed on the shafts 27; and these levers are slotted longitudinally at 39 to adjustably receive links 40 which are pivoted to standards 41 rising from the machine frame. As the stock feed-carriage is moved forwardly by its connection 15 under the vibration of the levers 14, the levers 38 will be carried along, but as the links 40 are fixed they will cause the levers 38 to rock backwardly on the shafts 27 as fulcra and consequently the pawls 36 will act upon the ratchets 35 and thus rotate the shafts 27 and the feed rolls 28 and cause the stock to be advanced additionally to its advance by the moving carriage. In this way the stock is not only fed up to the cutters, but it is also fed progressively into the cutters to complete the work. When the stock has been shaped, turned or cut, it is backed off from the cutters by the action of the cams 11 and 13, and these cams are so formed that when the carriage has reached the limit of the backward movement, there is a dwell. At this point the saws are brought into operation to cut off the turned or cut portions of the stock, and then recede. Fig. 1 shows the positions of parts at this period.

As the stock is cut up and is decreased in length to such an extent that it cannot be fed forward by the pawl and ratchet mechanism described, the feed mechanism is automatically rendered inoperative until a fresh piece of stock is put in place on the carriage. This automatic stop mechanism may be of any approved construction, but I prefer to use a curved arm or hook 42 pivoted in advance of the feed rolls on a horizontal bar 43 fast in the standard 30, said arm or hook reaching over such roll so that its free end will rest upon the stock. A trip lever 44 is pivoted on a bracket 45 fast on bar 43, so that one end will extend under the hook 42 and its other end under the pawl 36. When the stock becomes so short that the free end of the hook will drop down behind it, the hook will vibrate the trip lever 44 and cause it to throw the pawl 36 out of engagement with the ratchet and so arrest the feed of that piece of stock. This hook is provided with a projection 46 which contacts with the yoke 31 so as to prevent the hook from contacting with the feed roll when said hook descends.

As the carriage reverses or backs off, the saw-operating cam 12 begins to act. This cam engages a roller 47 on a bar 48, which is supported on the shaft 9 and is longitudinally movable on said shaft in the direction of the diameter of the cam, by virtue of its lengthwise slot 49, through which the shaft passes and by means of which the bar is supported in position to be engaged by the cam. The other end of this bar is jointed to one leg of a saw-carriage actuating-lever 50, of bell-crank type, which is pivoted at 51 to an adjusting link 52, slotted longitudinally and adjustably secured to the bracket 10 by means of bolts 53, so that the actuating lever may be adjusted into proper relation to the saw-carriage and the cam. The pivot member 51 is a rod extending transversely of the machine and supported by its ends in similar links 52 at opposite sides of the machine; and on this rod is pivoted an arm 54, which extends between lugs 55 on the lever 50 and is adjustable therein by means of set screws 56 carried by the lugs 55, so as to compensate for the reduction in diameter of the saw as it wears. The outer end of the arm 54 is slotted lengthwise at 57 and fastened to the saw carriage 58 by a bolt 59 passed through the slot 57 into said carriage; this slot and bolt connection permitting the necessary movement in converting the arcuate motion of the arm 54 into the right line reciprocation of the said carriage.

The saw carriage is a plate-like structure, mounted in guides 60 on the upright, transversely arranged frame members 61. Lateral brackets 62 extend from the plate-like structure through openings 63 in the frame members 61, and these brackets are provided with bearings 64 for the saw-shaft 65, on opposite ends of which are fixed the circular saws 66. The saws are arranged between the stock feed-carriages at opposite ends of the machine and below the horizontal plane of said carriages, and so as to be raised to the work and lowered away from it by the actuating mechanism previously described.

On extensions 67 of the frame members 61 are placed bearings 68 for the cutter-head shafts 69, each shaft having at opposite ends shaping tools or cutter-heads 70, of a construction suitable to produce the desired work or product. In the illustrated construction suitable to produce the desired a twist drill 71 to bore a hole through the work, and cutting blades or knives 72 to give external shape to the product. It will be noticed that these cutter-heads operate in a fixed position in their bearings, and instead of being moved up to the work, the work is moved up to them.

In order to operate the saws and the cutter-heads, any suitable driving mechanism may be employed, but I prefer to use a belt for this purpose, and to this end a pulley 73 is placed on the main shaft 4 and a pulley 74 is placed on the saw shaft, and a pulley 75 is placed on each of the cutter-head shafts 69, and a belt 76 is arranged about these pulleys so as to impart motion to them. In order to keep the belt in operative contact with the pulleys on the saw shaft and the cutter-head shaft, any suitable belt tightener may be used, such as a pressure roller 77 mounted on a swinging frame 78 pivoted at 79 to the frame of the machine. This swinging frame may be provided with a weight 80, shown in dotted lines Fig. 4, and so shown as not to obscure the parts behind it.

As shown, the machine is equipped with means to feed simultaneously four pieces of stock from which the product is to be derived; each piece of stock yielding a complete product at each succeeding operation, and four finished articles being produced simultaneously. The pieces of stock are laid upon the carriages and the feed roll lowered thereon, thereby holding them in place. Assuming that the parts are in the position shown in Fig. 1, the machine is set in motion; the carriages are moved toward the cutters by the action of the cams 11 and 13 on the levers 14; the boring and cutting beginning simultaneously. The carriages move forward throughout the shaping operation, and the feed rolls feed and hold the stock up to the shaping tools. When the shaping operation is completed and the feed-carriages are under way on their return motion, the cam 12 begins to move the saw carriage upward; and when the return motion of the carriages is completed, the shaped ends of the pieces of stock lie across the paths of the saws, and then the saws rise and cut off such shaped ends, and immediately recede. It will be noted that all of the cams 11, 12 and 13 are fixedly mounted upon the shaft 9 in exactly the same relation, but the feed carriage levers are connected with their cams on one side of said shaft, and the saw carriage lever is connected with its cam upon the opposite side of the shaft, thus exactly reversing their movements. These two points of operation are indicated in dotted lines at 47 and 81 in Fig. 1. As shown in Fig. 3, the cams have an advance of eight parts of the cycle, a return of six parts, and a dwell of ten parts and the cam turns in the direction indicated by the arrow. The cams as dotted in Fig. 1 are in the same position as in Fig. 3 in which the feed carriage is just ready to start on its advance. Now it will be seen that as the cams turn, the saw carriage operating point 47 will be in the dwell of the cam until the feed carriage has traveled the full distance forward and has returned part way. Then the saw carriage will begin to rise, but before it has risen sufficiently to come into contact with the stock, the point 81 will be traveling in the dwell of the cam and the carriage will be at rest until after the saw has risen, cut off the work, and partly returned, when the feed carriage will again advance. While the saws are cutting, the stock feed-carriages are held stationary by virtue of a dwell in their operating cams, and after the product is sawed off and the saws recede, then the cams 11 and 13 have turned over sufficiently to bring their actuating points into action to move the feed carriages forward again, when the series of operations is repeated.

The principle of the invention is susceptible of a variety of changes in structure and arrangement.

What I claim is:—

1. The combination of a shaping tool operating in a fixed position, a stock-feed carriage adapted to be adjusted to bring the stock into alinement with the shaping tool, means to move said carriage toward and from the shaping tool and to cause it to dwell when away from the shaping tool, auxiliary stock-feeding mechanism carried by the carriage, means actuated by the movement of the carriage to operate said auxiliary stock-feeding mechanism to advance the stock upon the carriage toward the shaping tool, means to sever the product from the stock, and means to operate said severing means during the dwell of the feed-carriage.

2. The combination of a stock-feed carriage, a rotary shaping tool arranged in fixed relation thereto, auxiliary stock-feeding means arranged upon the stock-feeding carriage, and means operated by the movement of the carriage to impart an additional movement to the auxiliary stock-feeding means to advance the stock upon the carriage toward the shaping tool, a saw, a saw carriage in which the saw is mounted, fixed guides in which the saw carriage is movable, a rotary shaft, and cams thereon for moving the stock-feed carriage toward and from said shaping tool and to cause it to dwell when away from said tool and to move the saw carriage into operative position during the dwell of said stock-feed carriage.

3. The combination with a shaping tool, of a stock-feed carriage, a vibrating lever connection with said carriage, and a rotary cam for actuating said lever to impart a forward progressive movement to said carriage in the direction of the shaping tool and then retract said carriage away from the shaping tool and cause it to dwell in its retracted position.

4. The combination with a shaping tool, of a stock-feed carriage, a vibrating lever connected with said carriage, a rotary cam for actuating said lever to impart a forward progressive movement to said carriage in the direction of the shaping tool and then retract said carriage away from said tool and cause it to dwell in its retracted position, a reciprocating saw carriage and a saw thereon arranged adjacent to the shaping tool, and a cam arranged to move the saw into severing contact with the work on the stock-feed carriage when the said stock-feed carriage is in its retracted position and during its dwell.

5. A plug making machine, comprising a rotary cutter head adapted to bore and shape the stock, a stock-feed carriage, a vibrating lever connected with said carriage, a cam for imparting a progressive forward movement to said carriage in the direction of the cutter head and to retract it and to cause it to dwell when retracted, an auxiliary stock-feed roll on said carriage having means to rotate it rendered operative to advance the stock on said carriage by the forward movement of the carriage, a saw carriage, fixed guides located below the stock-feed carriage in which the saw carriage may be reciprocated, a rotary cam, and a rock lever connection between the cam and saw carriage to reciprocate said saw carriage when the stock-feed carriage is in retracted position and during its dwell.

6. The combination with a reciprocating stock-feed carriage in which the stock is mounted, of an auxiliary stock-feed mechanism mounted on said carriage and moving with it and bearing upon the upper side of and serving to hold the stock in said feed-carriage, a stationary standard and a connection between said standard and the auxiliary stock-feed mechanism by which said auxiliary stock-feed mechanism is rendered active upon the forward reciprocation of the stock-feed carriage to advance the stock in said feed carriage.

7. The combination with a reciprocating stock-feed carriage in which the stock is mounted, of an auxiliary stock-feed roll adapted to bear upon the upper side of the stock and hold it in said feed carriage, means mounted on and moving with said carriage for supporting and operating said roll, a stationary standard, and an adjustable connection between said standard and the roll supporting and operating medium by which said auxiliary stock-feed roll is rendered operative upon the forward reciprocation of the feed carriage to advance the stock in said feed carriage.

8. The combination with a reciprocating stock-feed carriage in which the stock is mounted, of an auxiliary feed-roll mounted upon and traveling with said carriage and engaging the stock to hold it in said feed carriage, a pawl and ratchet mechanism carried by said feed carriage for turning said roll, a pawl carrier pivoted to the carriage, a stationary standard, and a link connecting said standard and pawl carrier to operate said pawl and ratchet mechanism to cause said feed-roll to advance the stock in said feed-carriage.

9. The combination with a reciprocating stock feed-carriage, of an auxiliary feed roll, a pawl and ratchet applied to said roll to rotate it, and a pawl tripping mechanism to throw the roll out of operation, consisting of a hook operated by the stock on the stock feed-carriage, and a tripping lever interposed between said hook and the pawl and actuated by the hook to disengage the pawl from the ratchet when the stock is too short to feed.

10. In a plug making machine, the combination with a shaping tool and a stock-feeding mechanism, of a reciprocating saw carriage and a rotary saw carried thereby, a rotary cam, and a saw carriage actuating mechanism operatively connected with said cam for moving the saw toward the stock after the stock has been shaped by said shaping tool, comprising a bell-crank lever, a lever arm pivotally mounted in said bell-crank lever, and means for laterally adjusting said lever arm in said bell-crank lever, whereby the movement of the saw carriage relatively to the stock may be varied to compensate for the reduction in diameter of the saw as it becomes worn.

11. The combination with a reciprocating stock-feed carriage in which the stock is supported, of an auxiliary stock-feed roll adapted to bear upon the upper side of and advance the stock in said reciprocating feed carriage, a tension yoke pivotally mounted upon and carried by said carriage, a shaft mounted in said yoke on which the auxiliary stock feed roll is mounted, and means to turn said auxiliary stock feed roll during the forward reciprocation of said feed carriage to advance the stock in said feed carriage.

12. A plug making machine, having a horizontally movable stock-feed carriage in which the stock is supported, a shaping tool, a saw carriage and saw thereon, means for moving the stock-feed carriage to the shaping tool and retracting it and causing it to dwell in its retracted position, means for holding and advancing the stock in said feed carriage during the movement of the feed carriage toward the shaping tool, and means for moving the saw carriage and its saw into sawing relation to the stock on the stock-feed carriage when in its retracted position and during the dwell therein to cut off the product, said stock-feed carriage and saw carriage moving means including like cams mounted upon a common shaft and turning together, and connections between certain of the cams and the stock-feed carriage and between another of the cams and the saw carriage, said connections arranged upon opposite sides of said shaft so that the stock-feed carriage is retracted and caused to dwell and the saw brought into cutting position when the stock-feed carriage is retracted and at rest.

13. A plug making machine, having a horizontally movable stock-feed carriage in which the stock is supported, a shaping tool, a saw carriage and a saw thereon, and means for moving the stock-feed carriage to the shaping tool and retracting it and causing it to dwell in its retracted position, and then moving the saw carriage and its saw into sawing relation to the stock on the stock-feed carriage when the said carriage is in its retracted position and during its dwell to cut off the product, said means including two cams and connections between them and the stock-feed carriage, and another cam and a connection between it and the saw carriage, said cams being alike and fixed to a common shaft, and said connections engaging the cams upon opposite sides of the shaft.

14. A multiple plug making machine, comprising a frame, stock feed-carriages arranged at opposite ends of said frame, a pair of cams arranged at one end of said frame, vibrating levers actuated by said cams and connected with the carriage at one end of the frame, vibrating levers at the opposite end of the frame connected with the carriage at that end, rods connecting opposite ends of said vibrating levers at opposite ends of said frame, shaping tools mounted upon the frame between said carriages and in fixed relation thereto, a saw carriage, fixed guides interposed in the frame between its ends in which the saw carriage is vertically movable, a saw shaft mounted in the upper ends of said saw carriage and having circular saws at its opposite ends, a cam, a saw carriage actuating lever, a connection between said lever and said cam, and a driving mechanism common to said cams, shaping tools and saws.

In testimony whereof I have hereunto set my hand this 21st day of April, A. D. 1913.

HENRY HOFF.

Witnesses:
C. O. LEESE,
C. G. KINSEY.

Copies of this patent may be obtained for five cents each, by addressing the "Commissioner of Patents, Washington, D. C."

It is hereby certified that in Letters Patent No. 1,096,718, granted May 12, 1914, upon the application of Henry Hoff, of York, Pennsylvania, for an improvement in "Plug-Making Machines," an error appears in the printed specification requiring correction as follows: Page 3, line 43, strike out the words "suitable to produce the desired" and insert the words *each cutter-head is provided with;* and that the said Letters Patent should be read with this correction therein that the same may conform to the record of the case in the Patent Office, and it is further certified that the signatures of the witnesses to the signature of the patentee should read *C. A. Geesey* and *C. G. Kinzie* instead of "C. O. Leese" and "C. G. Kinsey."

Signed and sealed this 26th day of May, A. D., 1914.

[SEAL.]

R. F. WHITEHEAD,
*Acting Commissioner of Patents.*